Feb. 17, 1953 S. H. GILLESPIE 2,628,467
MOWER ATTACHMENT FOR TRACTORS
Filed Oct. 4, 1949 2 SHEETS—SHEET 1
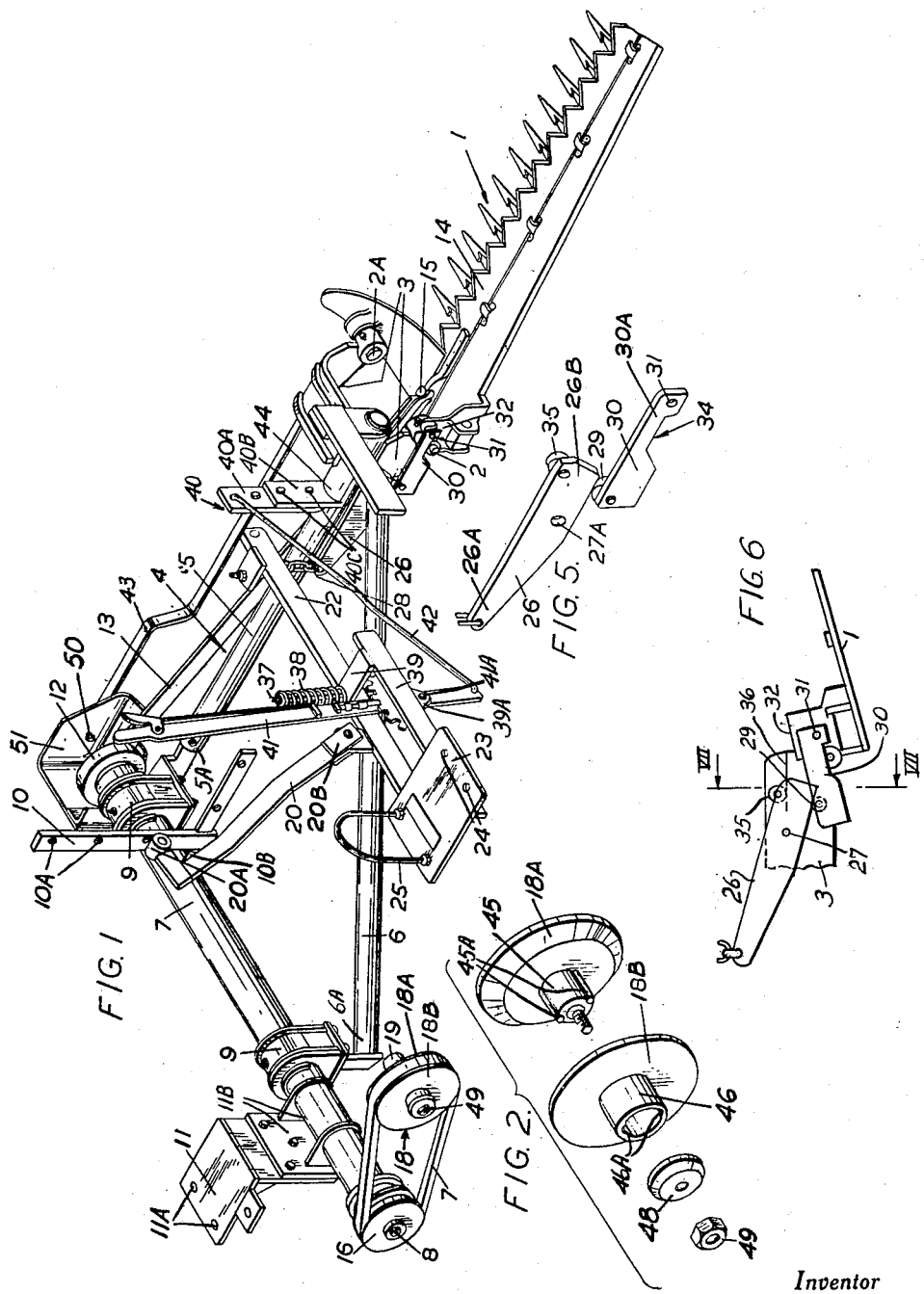
Inventor
SYDNEY HERBERT GILLESPIE,
By John B. Brody
Attorney Feb. 17, 1953 — S. H. GILLESPIE — 2,628,467
MOWER ATTACHMENT FOR TRACTORS
Filed Oct. 4, 1949 — 2 SHEETS—SHEET 2
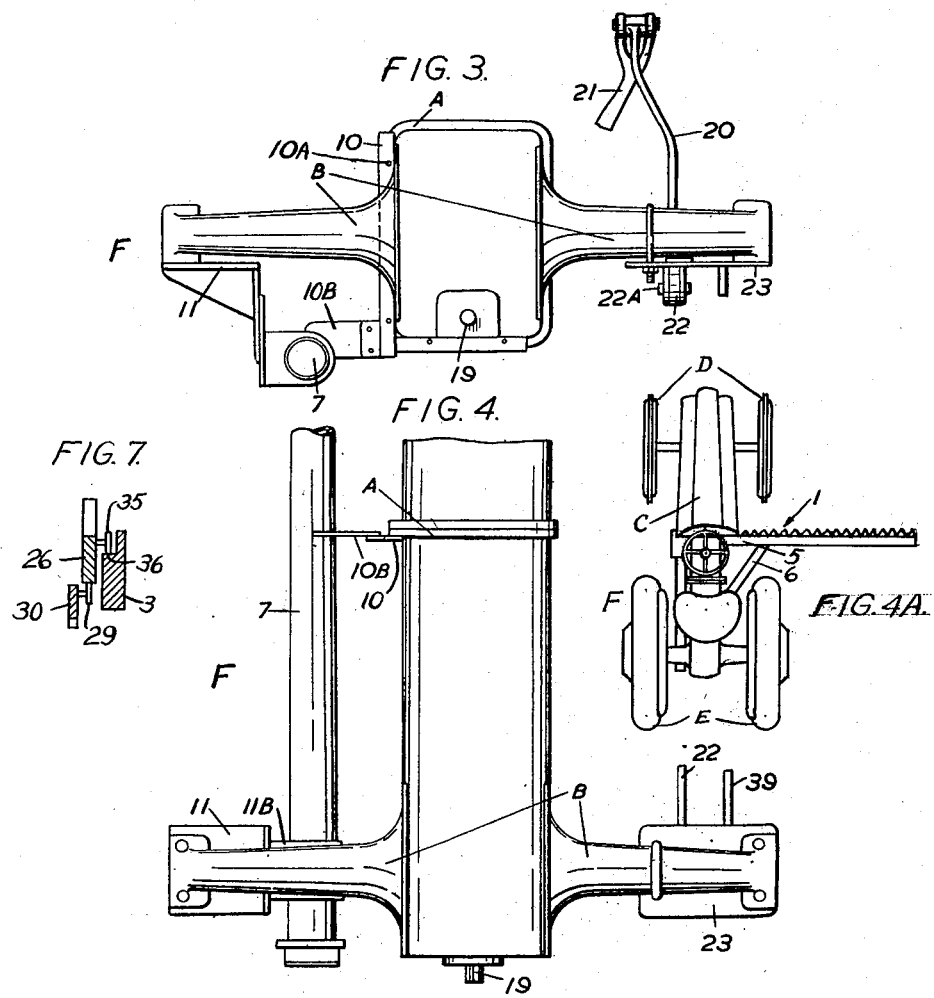
Inventor
SYDNEY HERBERT GILLESPIE,
By John A. Brady
Attorney Patented Feb. 17, 1953

2,628,467

UNITED STATES PATENT OFFICE 2,628,467

MOWER ATTACHMENT FOR TRACTORS

Sydney Herbert Gillespie, Kilgarrow, Newtown Butler, Northern Ireland, assignor to Featherstone Agricultural Limited, Middlesex, England Application October 4, 1949, Serial No. 119,500
In Great Britain October 16, 1948

4 Claims. (Cl. 56—25)

This invention relates to mowers having a cutter bar and for attachment to and operation by agricultural tractors of the type which comprise a rear power take off shaft and trailingly connected draft links at the rear for supporting and pulling agricultural implements or the like, the links being vertically movable by a power lift unit on the tractor. In United States patent specification No. 2,118,180 which discloses an example of tractors of this type there are two laterally spaced draft links connected by vertical rods to cranks on a crank shaft actuable by an hydraulic ram in the tractor.

The object of the invention is to provide a mower with improved means for adjusting the cutter bar thereof.

In order that the invention may be clearly understood the following specific embodiment will now be described, but merely by way of example, with reference to the accompanying drawing in which Fig. 1 is a top perspective view of the mower prior to its attachment to the tractor, Fig. 2 is an exploded detail view to a larger scale of part of the drive from the tractor, Figs. 3 and 4 are respectively rear and plan views, with parts removed, showing the attachment of the mower to a tractor, Fig. 4A is a diagrammatic plan view of the tractor with the mower attached, Fig. 5 is a perspective view and Fig. 6 a rear elevation of a detail of the raising mechanism for the cutter bar, and Fig. 7 is a sectional detail view on the line VII—VII of Fig. 6.

Referring to the drawings:

The cutter bar 1 is capable of hinging up and down about hinge pins 2 and 2A on a hinge bracket 3.

The bracket 3 is carried by a carrier frame 4 which comprises a transverse bar 5 extending across under the tractor C (Fig. 4A) between the front and rear wheels D and E respectively and a bracing strut 6 which extends across and rearwardly under the tractor C. The ends 5A and 6A of bar 5 and strut 6 respectively are pivotally connected at 9 to a fore and aft tubular casing 7, housing a fore and aft driving shaft 8.

The casing 7 is removably attached to the tractor by means of fore and aft brackets 10 and 11 respectively, secured to the casing by mountings 10B and 11B fixed on the casing. The bracket 10 consists of an L member with bolt holes 10a therein to receive bolts by which it is removably attached to the flange A of the tractor casing, and the bracket 11 consists of an inverted L member also with bolt holes 11A to receive bolts by which it is removably attached to the rear axle housing B at the near side F of the tractor. The forward end of the shaft 8 has thereon a crank disc 12 driving a connecting rod 13 extending across under the tractor and connected to the reciprocating knife 14 in the usual manner, to actuate same. At its rear end, the drive shaft 8 projects from the casing 7 and carries a V-pulley 16 driven through a V-belt 17 by an adjustable V-pulley 18 fixed to the power takeoff shaft 19 at the rear of the tractor. The pulley 18 is in two halves 18A and 18B (Fig. 2), the half pulley 18A being suitably mounted on the shaft 19 for rotation therewith and having a central boss 45 on which is slidably keyed a sleeve 46 on the half pulley 18B by means of cooperating keys and grooves 45A and 46A. A screw threaded pin on the boss 45 carries a cap 48 engaged by a nut 49 threaded on the pin. By appropriate adjustment of the nut 49, the half pulley 18B is moved axially towards or from the half pulley 18A. The pulley is thus adjusted to take up belt wear and so avoids the use of a jockey pulley. A belt drive has the advantage over a drive through meshing toothed wheels in that the belt will tend to slip when the cutter teeth jam, so that damage to the mower will be prevented.

Means for raising the cutter bar 1 and carrier frame 4 by using the power lift of the tractor comprises a vertical link 20 pivotally connected at its top end 20A to a power lift crank 21 (Fig. 3) and at its lower end 20B to a fore and aft bar 22 which is pivoted at 22A to the underside of a bracket plate 23. Bolt holes 24 and a U-bolt 25 provide for removable attachment of the plate 23 to the underside of the rear axle housing. The forward end of the bar 22 is connected to the cutter bar 1 by cam mechanism including a cam lever 26 pivotally mounted on the bracket 3 by means of a pivot pin 27 on the bracket (Fig. 6) engaging in an opening 27A in the lever (Fig. 5). One end of the lever 26 is connected to the bar 22 by a chain 28 and the other end engages a roller 29 on a cam follower 30 pivotally connected at 31 to a bracket 32 on the cutter bar 1. The underside of the follower 30 is recessed at 34 and rests on the hinge pin 2. With this arrangement, when the crank 21 is raised the cam 26 is rocked upwardly at one end 26A so that its other end 26B depresses the end of the follower 30 which fulcrums about the pin 2 and rocks upwards at its forward end 30A, and so hinges up the cutter bar 1 which is thus under the control of the hydraulic lift. A stop 35 on the cam 26 engages an abutment 36 on the bracket 3 to limit the pivotal movement of the cam, so that on continued lifting movement of the bar 22 the carrier frame 4 is caused to pivot upwards about the axis of its bearings 9 and so lift the bracket 3, together with the bar 1, clear of the ground to an out-of-use position. By virtue of the fact that the pivots 9 have a common axis, the cutter bar remains at a constant pitch on pivotal movement of the carrier frame 4.

The frame 4 is provided with spring suspension by means of a rod 37 connected to the strut 6 and acting upon a compression spring 38 mounted on a bracket 39 secured to the plate 23.

The bracket 3 has thereon a sleeve 44 rotatably carried by the bar 5 and formed with a crank arm 40 consisting of two parts 40A, 40B bolted together at 40C, the outer part 40A being connected to a hand lever 41 by a rod 42 and the inner part 40B being formed unitary with the sleeve 44. The lever 41 pivots at 41A on a lug 39A on the bracket 39. By adjustment of the hand lever 41 the rod 42 actuates the crank arm 40, causing rotation of the sleeve 44 and with it the bracket 3 and cutter bar 1, so that tilting of the cutter bar is effected to vary the pitch thereof. To protect the transverse connecting rod 13 it is preceded by a transverse guard 43 secured by a bolt 50 to a shield 51 for the crank disc 12.

The arrangement described has the following advantages:

(a) The location of the cutter bar forwardly of the rear wheels, instead of at the rear as is usual, enables the operator readily to watch the mower in operation and more readily manoeuvre it clear of obstacles, and allows the attachment of any other implement or the like to the rear drawbar even when the mower is in use, this not being possible with a mower which is attached at the rear. For example, by attaching a loader at the rear, cutting and loading are possible simultaneously.

(b) The attachment means constitutes a simple and readily actuable means for quick attachment and detachment of the mower.

(c) The cutter bar can be tilted and it can also be raised and lowered, all from the driver's seat and while the mower is operating.

(d) The cutter bar in operation rests continuously on the ground irrespective of the angle assumed by the tractor in passing over uneven ground, thereby ensuring perfect cutting at all times.

(e) The cam lift arrangement enables angular lift of the cutter bar for turning and for missing the crop, the cam giving a pivotal lift to the cutter bar independently of the lift of the hinged frame.

Various modifications of the abovedescribed example may be made without departing from the scope of the invention.

I claim:

1. A mower for attachment to a tractor of the type including front and rear wheels, a rear power take-off shaft, draft link means trailingly connected to the rear for supporting and pulling agricultural implements or the like, and a power lift unit for moving the link means vertically, said mower comprising carrier means, a cutter bar pivotally mounted on the carrier means for vertical hinging movement, attachment means on the carrier means for attaching the carrier means to the tractor with the carrier means extending laterally of the tractor and with the cutter bar projecting laterally from one side of the tractor forward of the tractor rear wheels, the carrier means being pivotally connected to the attachment means for vertical hinging movement, drive means extending forwardly from the power take-off shaft and adapted to actuate the cutter bar, a cam lever pivotally mounted intermediate its ends on the carrier means, a cam follower pivotally supported intermediate its ends on the carrier means and pivotally connected at one end to the cutter bar, said cam lever pivoting to engage and depress the other end of the follower to cause upward hinging movement of the cutter bar, an operative connection between the tractor power lift unit and said cam lever, and an abutment on the carrier means adapted to limit the pivotal movement of said cam lever whereby continued operation of the power lift effects upward hinging movement of the carrier means.

2. A mower as claimed in claim 1, having carrier means which include a bracket on which the cutter bar is pivotally mounted for vertical hinging movement and which is pivotally mounted for tilting movement on a transverse axis, a manually operable lever accessible from the driver's seat on the tractor, a crank arm on the bracket, and a link connecting the lever and crank arm, operation of the lever causing tilting of the cutter bar to vary the pitch thereof.

3. A mower as claimed in claim 1, wherein the carrier means consists of a frame mounted on the attachment means for hinging movement on spaced fore and aft pivots arranged on a common axis, thereby enabling the cutter bar to remain at a constant pitch on hinging movement of the frame.

4. The combination with its tractor of a mower according to claim 1, wherein a belt and pulley drive connects the power take-off shaft with the mower drive means and a pulley of the drive consists of two complementary pulley parts adjustable axially of the pulley towards and from each other to vary the belt tension.

SYDNEY HERBERT GILLESPIE.

REFERENCES CITED

The following references are of record in the file of this patent:

UNITED STATES PATENTS

| Number | Name | Date |
|---|---|---|
| 1,074,188 | McGlynn | Sept. 30, 1913 |
| 1,855,838 | Kranick | Apr. 26, 1932 |
| 1,963,913 | Hunter | June 19, 1934 |
| 2,060,280 | Clapper | Nov. 10, 1936 |
| 2,098,948 | Foushee et al. | Nov. 16, 1937 |
| 2,289,598 | Sladecek | July 14, 1942 |
| 2,328,838 | Oberlink | Sept. 7, 1943 |
| 2,422,044 | Ronning et al. | June 10, 1947 |
| 2,457,693 | Leicy | Dec. 28, 1948 |

FOREIGN PATENTS

| Number | Country | Date |
|---|---|---|
| 564,087 | Germany | Nov. 14, 1932 |